(12) United States Patent
Wickland

(10) Patent No.: US 10,694,859 B1
(45) Date of Patent: Jun. 30, 2020

(54) COLLAPSIBLE TRAVEL STOOL

(71) Applicant: Valerie Wickland, Palm Desert, CA (US)

(72) Inventor: Valerie Wickland, Palm Desert, CA (US)

(*) Notice: Subject to any disclaimer, the term of this patent is extended or adjusted under 35 U.S.C. 154(b) by 1 day.

(21) Appl. No.: 16/278,829

(22) Filed: Feb. 19, 2019

(51) Int. Cl.
*A47C 16/02* (2006.01)
*B64D 11/06* (2006.01)
*B60N 3/06* (2006.01)

(52) U.S. Cl.
CPC ............... *A47C 16/02* (2013.01); *B60N 3/06* (2013.01); *B64D 11/06* (2013.01)

(58) Field of Classification Search
CPC ........... A47B 5/04; A47B 19/08; A47B 17/00; A47B 85/00; A47B 85/06; A47B 19/00; A47B 19/02; A47B 23/044
See application file for complete search history.

(56) References Cited

U.S. PATENT DOCUMENTS

| | | | | |
|---|---|---|---|---|
| 3,872,800 A | * | 3/1975 | Wallis | A47B 17/00 108/6 |
| 4,618,120 A | * | 10/1986 | Wattles | F16B 12/20 211/189 |
| 4,630,861 A | * | 12/1986 | Henschel | A47C 4/08 108/124 |
| 4,991,908 A | | 2/1991 | Krechel | |
| 6,325,343 B1 | * | 12/2001 | Flagg | A47B 19/08 248/174 |
| 6,478,380 B2 | | 11/2002 | Ehrlich | |
| 7,007,771 B2 | | 3/2006 | Rawlings | |
| 8,267,477 B1 | | 9/2012 | Finn | |
| 8,414,079 B1 | | 4/2013 | Zenoff | |
| 8,757,723 B1 | | 6/2014 | Faust | |
| 10,271,655 B1 | * | 4/2019 | Gwen | A47C 4/10 |
| 2006/0103219 A1 | * | 5/2006 | Sardana | A47C 16/02 297/423.41 |
| 2012/0192343 A1 | * | 8/2012 | Richardson | A47K 11/02 4/449 |
| 2014/0131138 A1 | * | 5/2014 | Simpson | A47C 12/00 182/223 |
| 2017/0215594 A1 | * | 8/2017 | Baker | A47C 12/00 |

FOREIGN PATENT DOCUMENTS

| | | | |
|---|---|---|---|
| GB | 2440224 | 7/2006 | |
| WO | WO-8301561 A1 | * 5/1983 | ............. A47B 19/08 |
| WO | 2016201072 | 6/2015 | |

* cited by examiner

*Primary Examiner* — David E Allred
(74) *Attorney, Agent, or Firm* — Kyle A. Fletcher, Esq.

(57) ABSTRACT

The collapsible travel stool is a stool with an inclined top that may be used as a footrest. The top surface, the left side wall, and the right side wall may be hinged so that the collapsible travel stool collapses flat for storage and transport. The top surface may be an inclined plane adapted for a user to place their feet upon when the collapsible travel stool is open and in front of a seat. As a non-limiting example, the collapsible travel stool may be used on a commercial aircraft to improve comfort during long trips.

18 Claims, 8 Drawing Sheets

COLLAPSIBLE TRAVEL STOOL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of footstools, more specifically, a collapsible travel stool.

SUMMARY OF INVENTION

The collapsible travel stool is a stool with an inclined top that may be used as a footrest. The top surface, the left side wall, and the right side wall may be hinged so that the collapsible travel stool collapses flat for storage and transport. The top surface may be an inclined plane adapted for a user to place their feet upon when the collapsible travel stool is open and in front of a seat. As a non-limiting example, the collapsible travel stool may be used on a commercial aircraft to improve comfort during long trips.

An object of the invention is to provide a footstool.

Another object of the invention is to provide an inclined top surface on the footstool.

A further object of the invention is to provide hinged joints such that the footstool collapses for storage and transport.

Yet another object of the invention is to provide a top surface that is asymmetrical from front to rear for properly collapsing the footstool.

These together with additional objects, features and advantages of the collapsible travel stool will be readily apparent to those of ordinary skill in the art upon reading the following detailed description of the presently preferred, but nonetheless illustrative, embodiments when taken in conjunction with the accompanying drawings.

In this respect, before explaining the current embodiments of the collapsible travel stool in detail, it is to be understood that the collapsible travel stool is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the collapsible travel stool.

It is therefore important that the claims be regarded as including such equivalent construction insofar as they do not depart from the spirit and scope of the collapsible travel stool. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
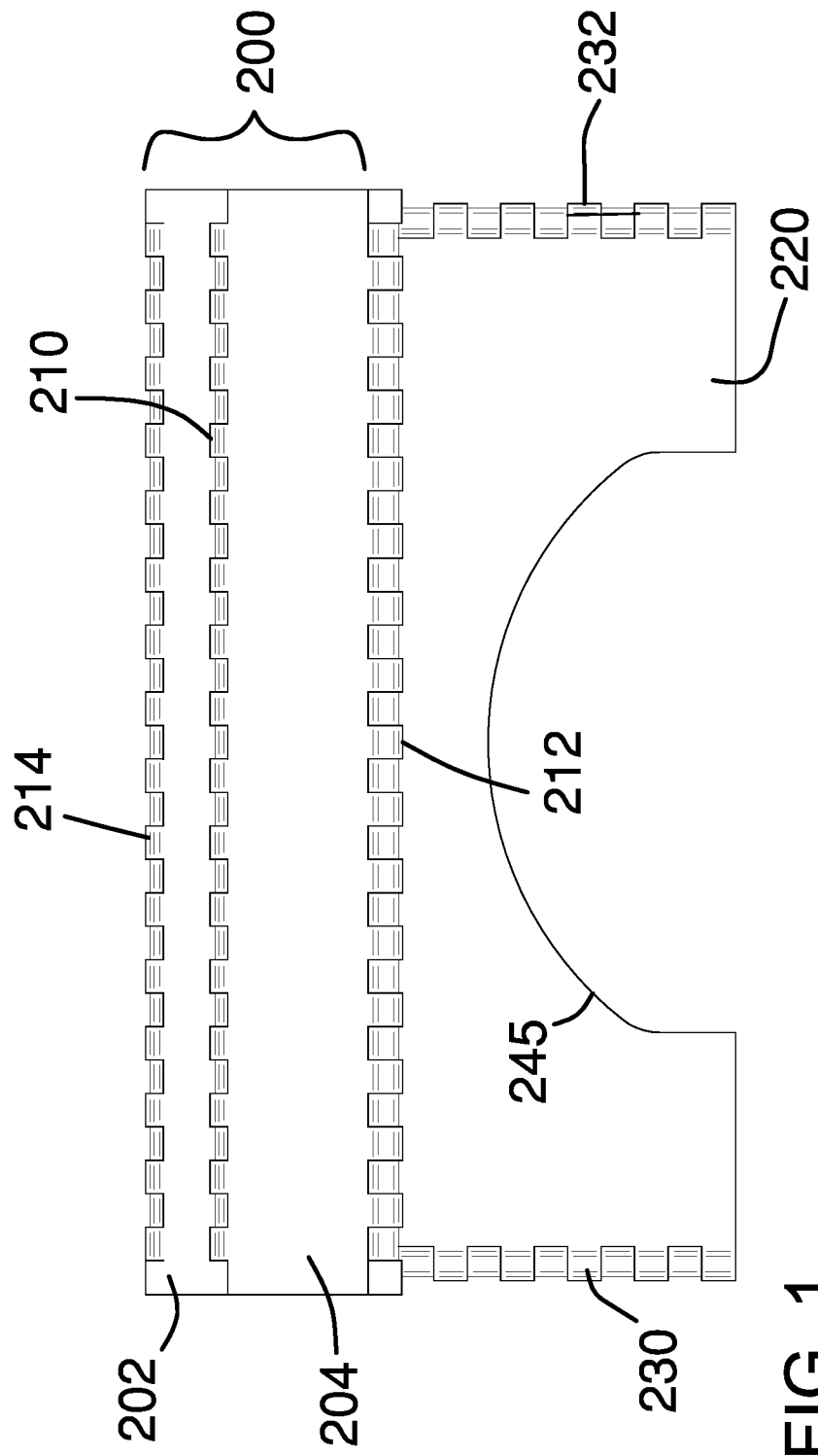
FIG. 1 is a front view of an embodiment of the disclosure.
Figure 2:
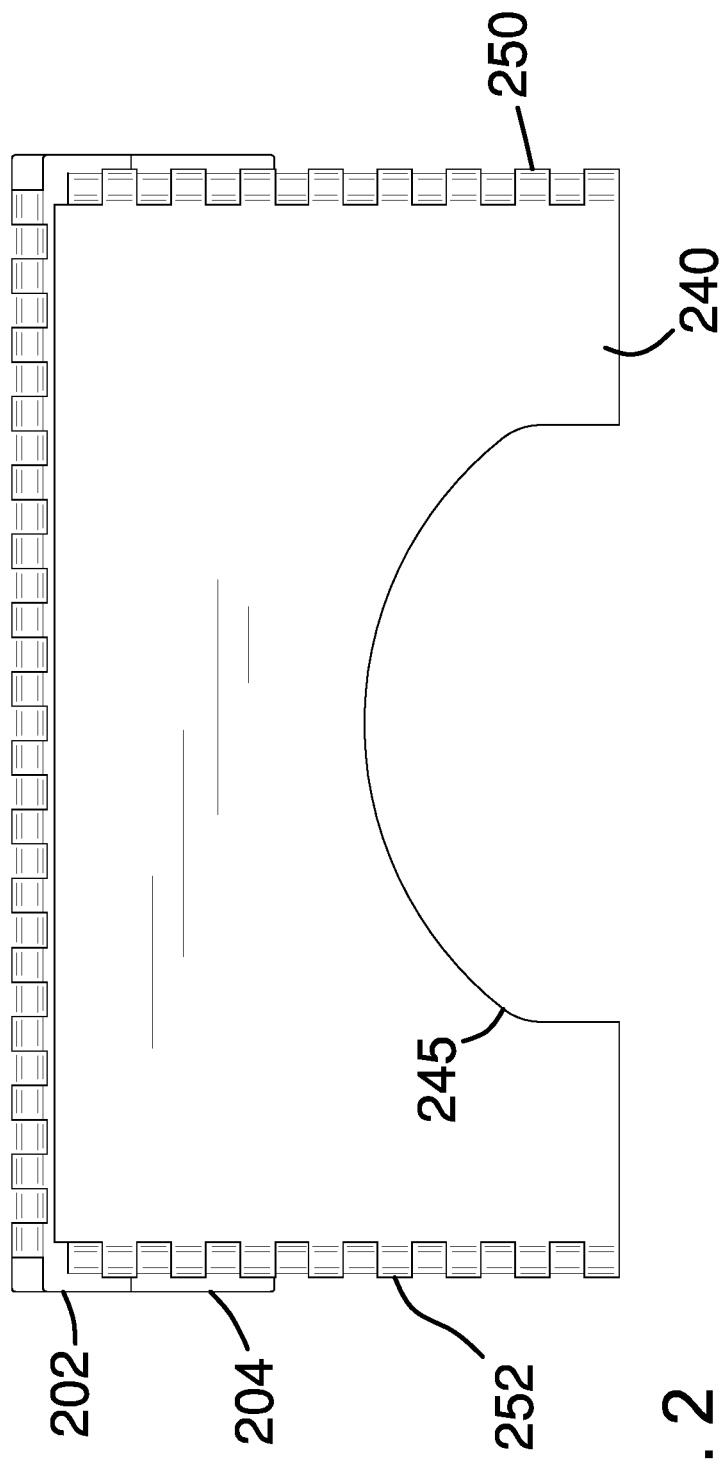
FIG. 2 is a rear view of an embodiment of the disclosure.
Figure 3:
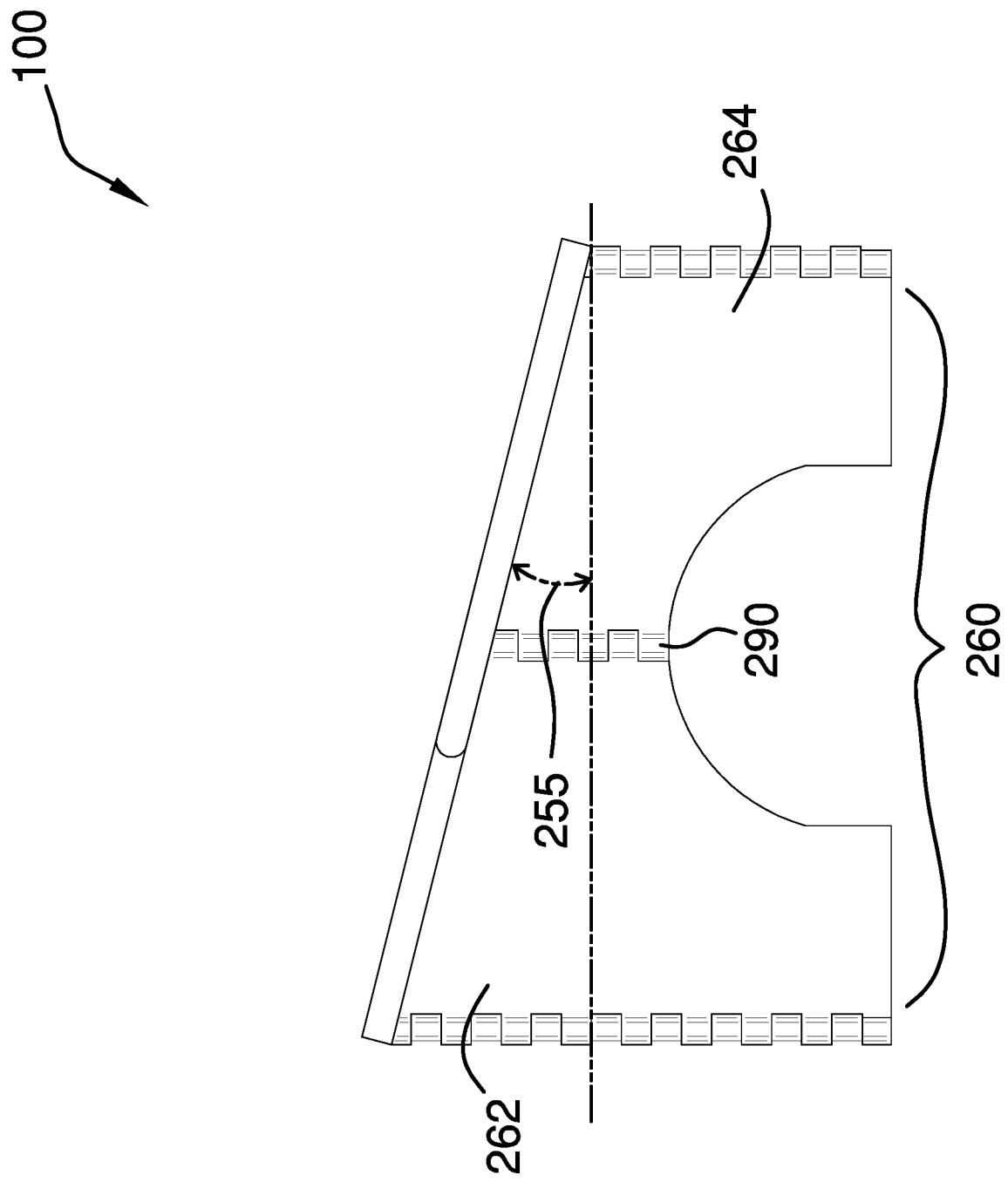
FIG. 3 is a side view of an embodiment of the disclosure.
Figure 4:
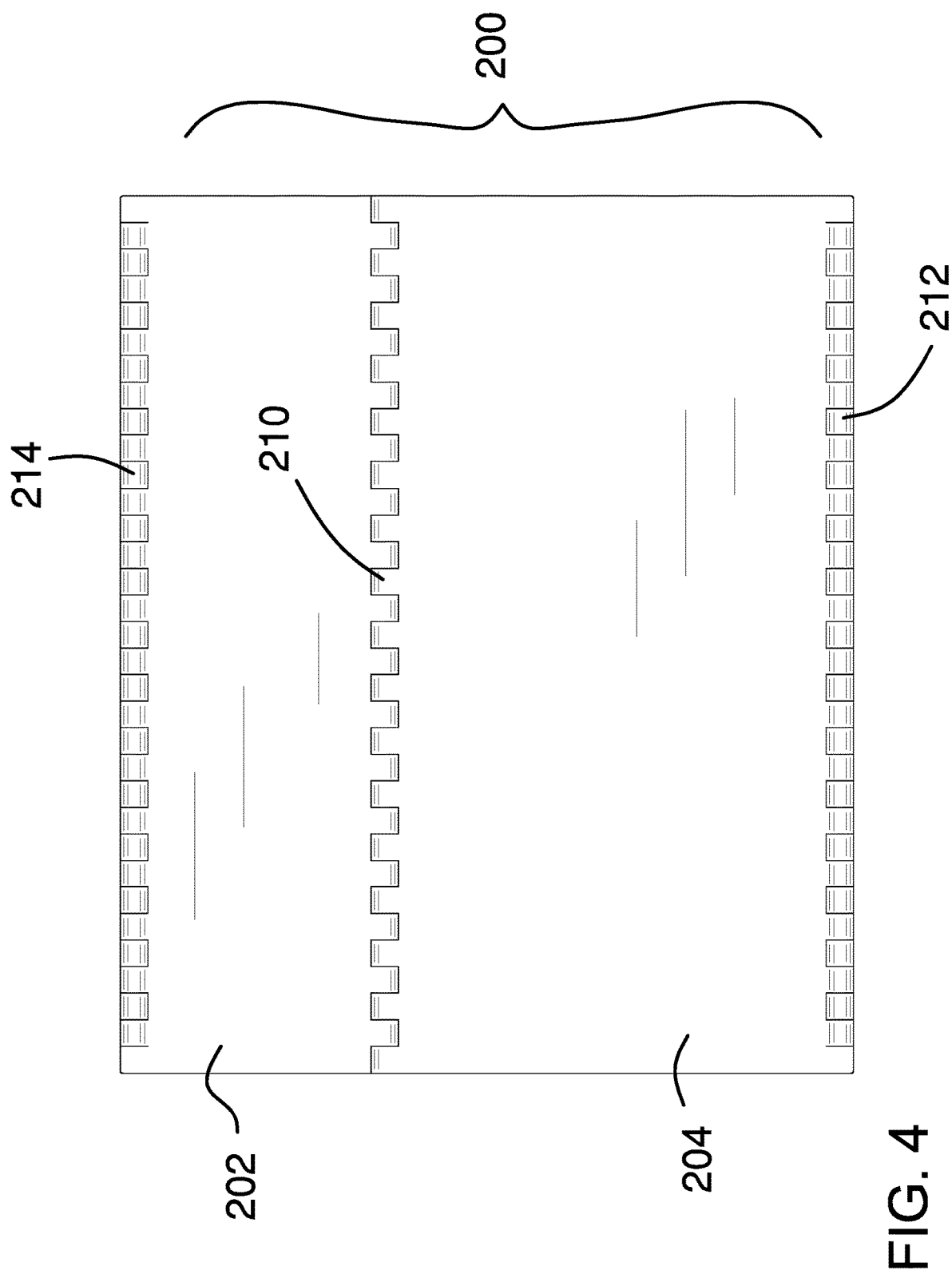
FIG. 4 is a top view of an embodiment of the disclosure.
Figure 5:
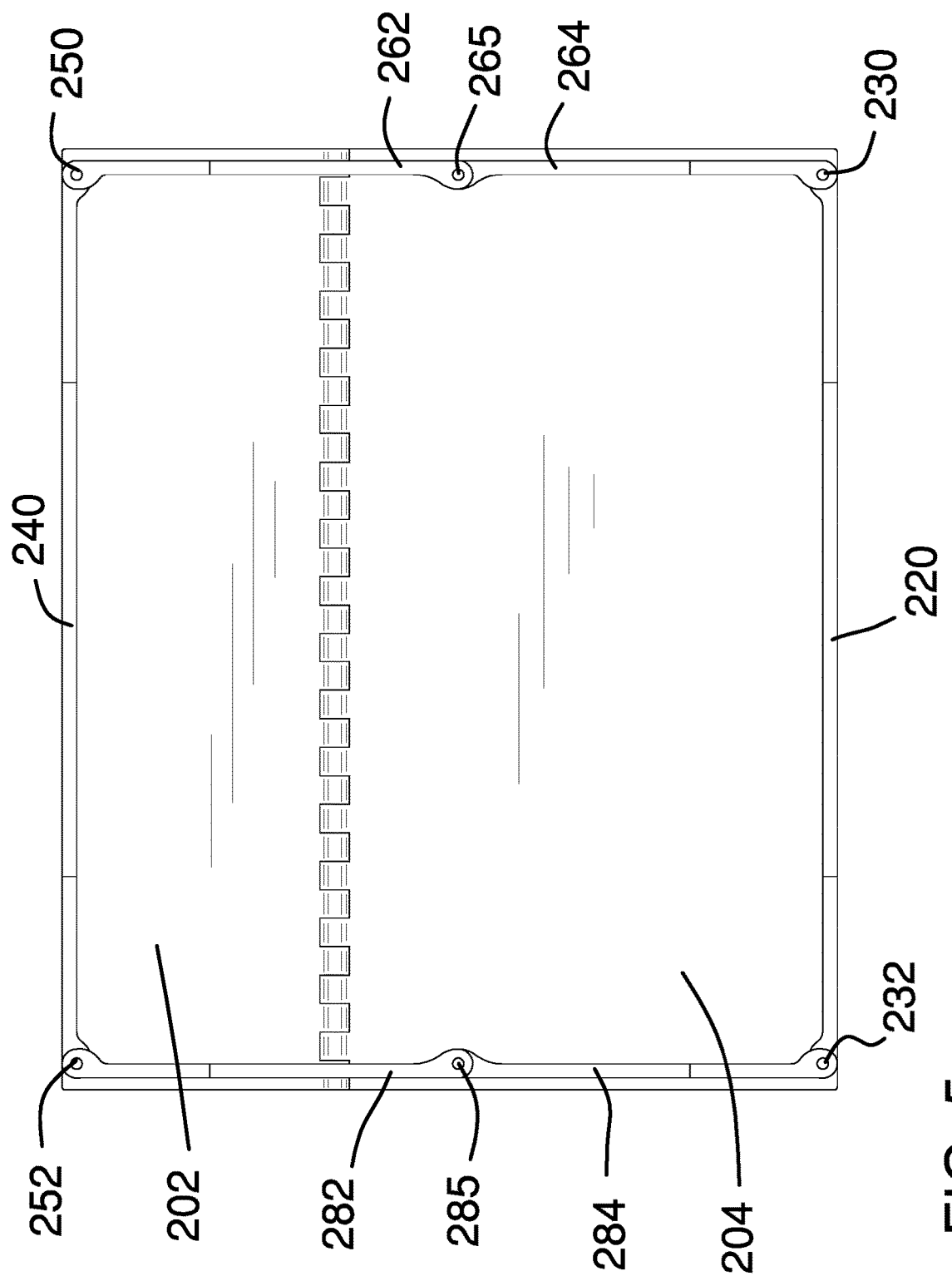
FIG. 5 is a bottom view of an embodiment of the disclosure.
Figures 6, 7:
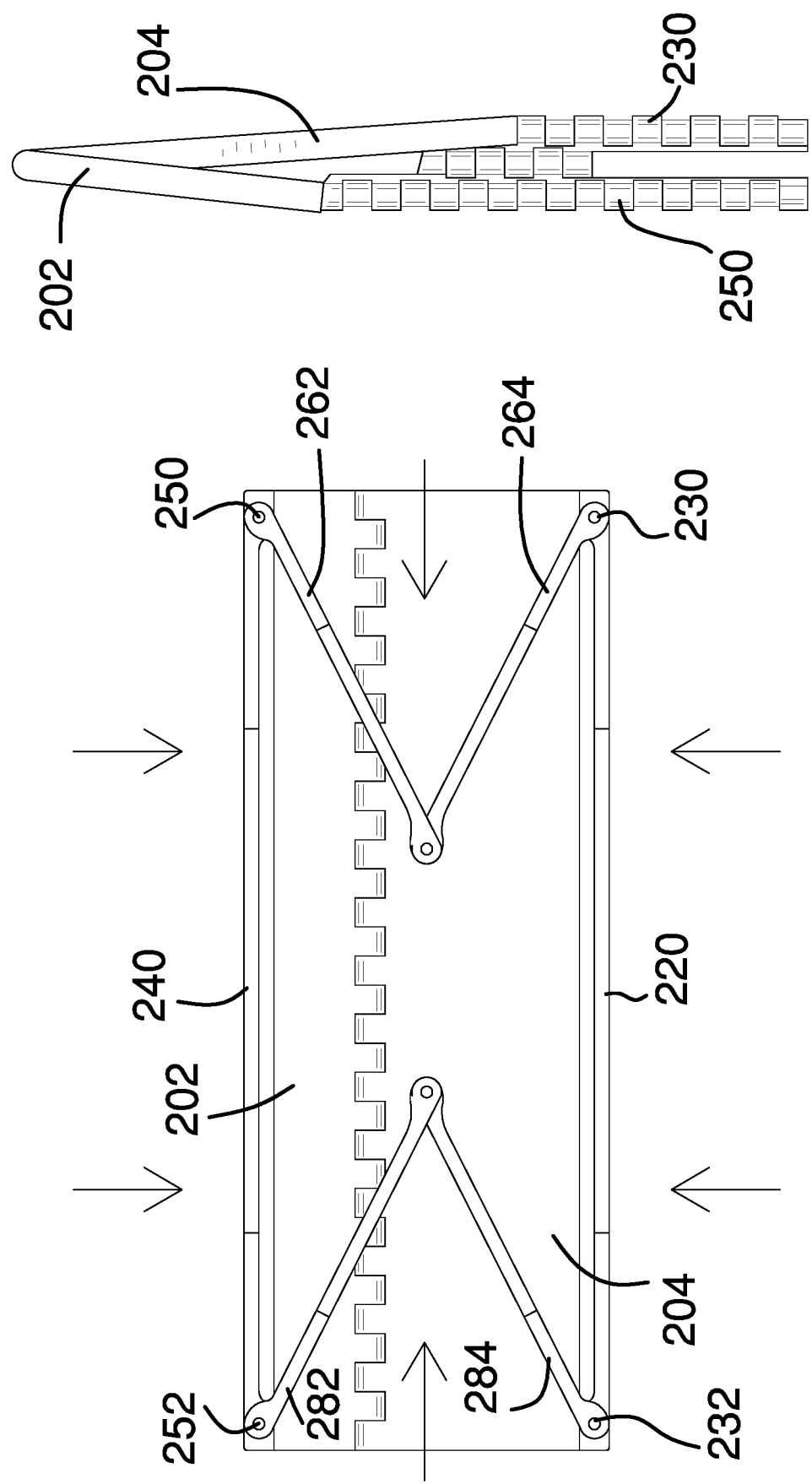
FIG. 6 is a bottom view of an embodiment of the disclosure illustrating the movement of all sides while the stool is collapsing.
FIG. 7 is a side view of an embodiment of the disclosure illustrating the stool fully collapsed.
Figure 8:
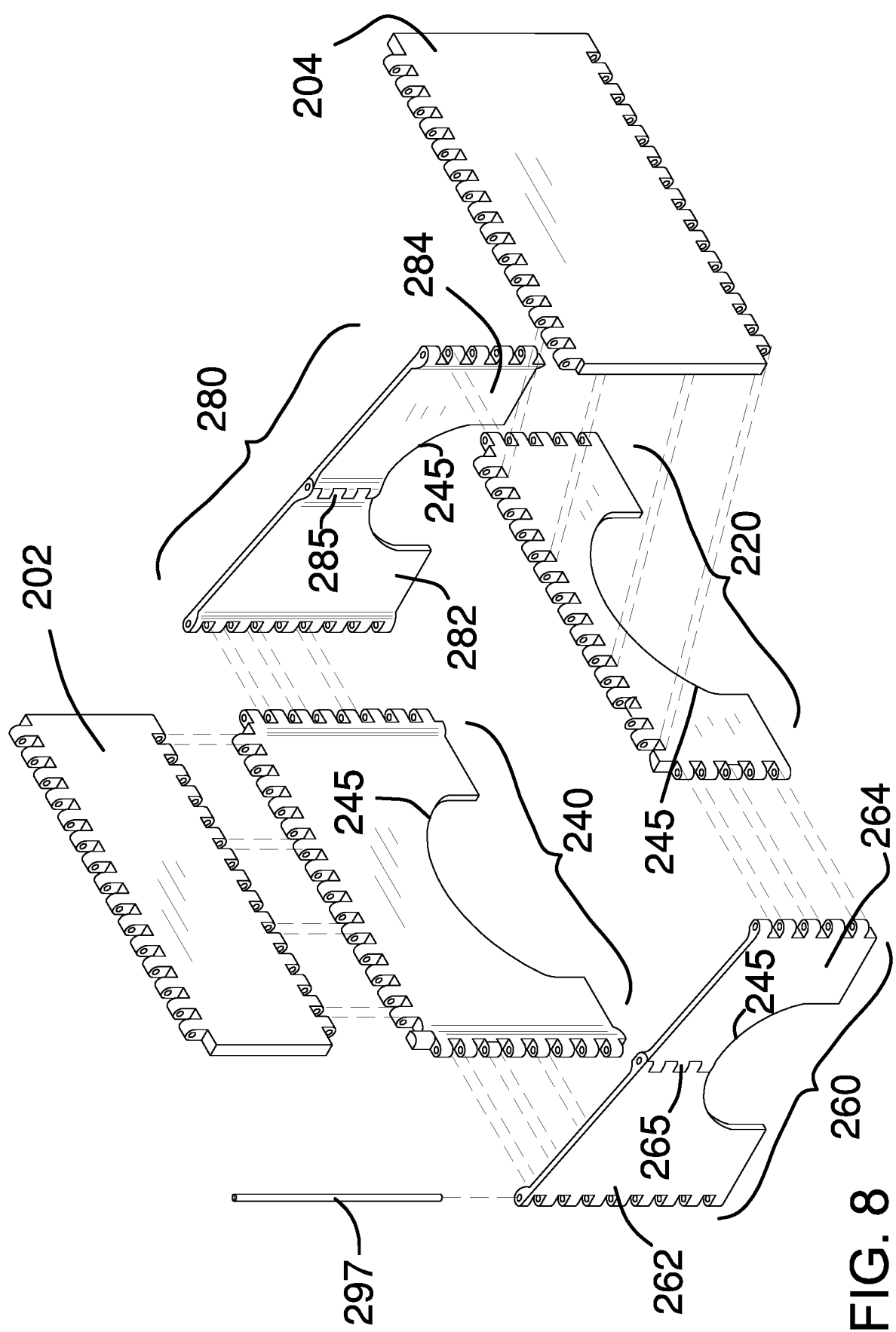
FIG. 8 is an exploded view of an embodiment of the disclosure.
Figure 9:
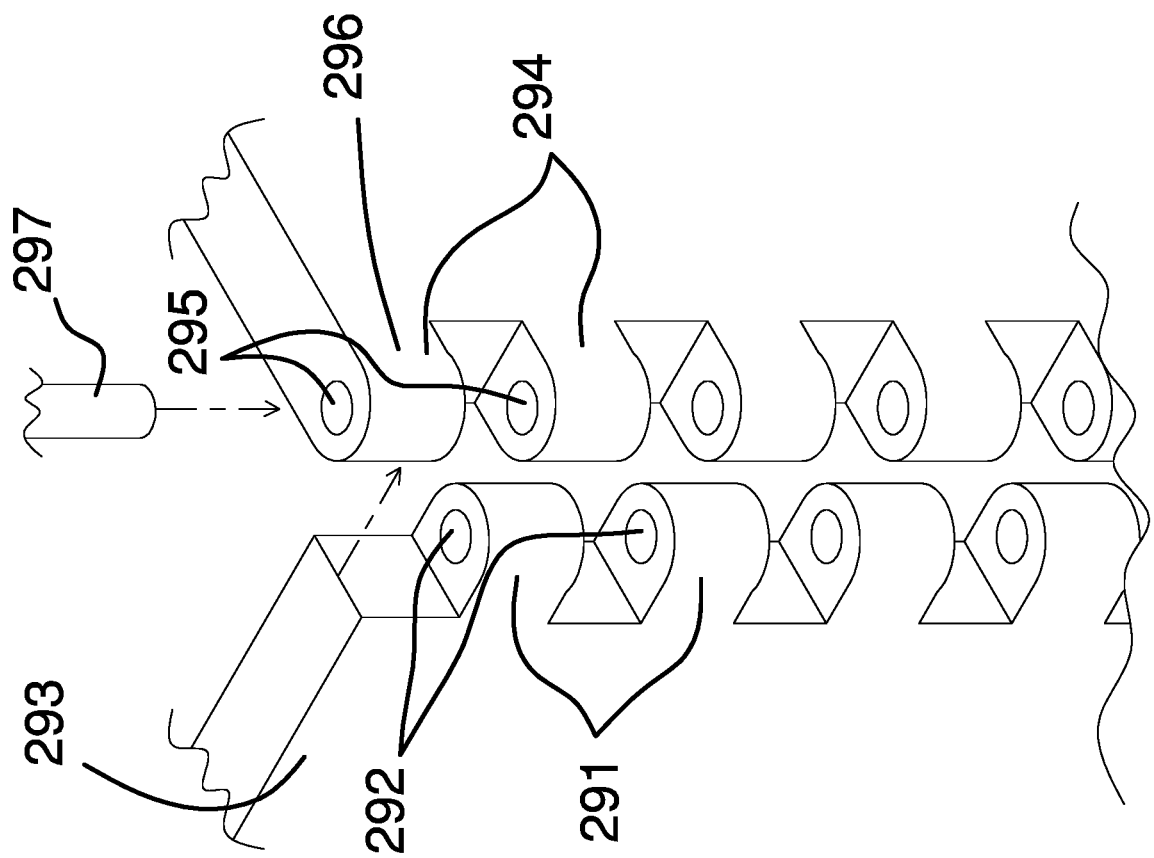
FIG. 9 is a detail view of an embodiment of the disclosure illustrating one hinge, which is typical of all hinges.

Detailed reference will now be made to a first potential embodiment of the disclosure, which is illustrated in FIGS. 1 through 9.

The collapsible travel stool 100 (hereinafter invention) comprises a top surface 200, a front wall 220, a rear wall 240, a left side wall 260, and a right side wall 280. The invention 100 is a stool with an inclined top that may be used as a footrest. As a non-limiting example, the invention 100 may be used on a commercial aircraft to improve comfort during long trips. The top surface 200, the left side wall 260, and the right side wall 280 may be hinged so that the invention 100 collapses flat for storage and transport.

The top surface 200 may be an inclined plane adapted for a user to place their feet upon when the invention 100 is open and in front of a seat. The top surface 200 may be at least as wide as the width of the front wall 220 and the rear wall 240. The top surface 200 may be higher at the rear of the invention 100 than it is at the front of the invention 100. The rear edge of the top surface 200 may be hingedly coupled to the top edge of the rear wall 240 via a top rear hinge 214. The front edge of the top surface 200 may be hingedly coupled to the top edge of the front wall 220 via a top front hinge 212. The top surface 200 may rest upon the top edge of the left side wall 260 and upon the top edge of the right side wall 280 when the invention 100 is opened for use, even though the top surface 200 is not coupled to the left side wall 260 or to the right side wall 280.

The top surface 200 may comprise a top front panel 204 and a top rear panel 202. The front edge of the top rear panel 202 may be hingedly coupled to the rear edge of the top front panel 204 via a top center hinge 210. The top front panel 204 and the top rear panel 202 may be equal widths. The top front panel 204 may be longer front-to-rear than the top rear panel 202 such that the top center hinge 210 is closer to the rear wall 240 than to the front wall 220. in some embodiments, the ratio of length of the top front panel 204 to the length of the top rear panel 202 may be substantially the same as the ratio of the height of the rear wall 240 to the height of the front wall 220.

The top center hinge 210 may hinge such that the top center hinge 210 moves upwards. The top front panel 204 and the top rear panel 202 may lift up at the top center hinge 210 while remaining coupled to each other as the invention 100 collapses. The top front panel 204 may remain coupled to the front wall 220 and the top rear panel 202 may remain coupled to the rear wall 240 as the invention 100 collapses.

The front wall 220 may be a support for the front edge of the top surface 200. The left edge of the front wall 220 may be hingedly coupled to the front edge of the left side wall 260 via a left front hinge 230. The right edge of the front wall 220 may be hingedly coupled to the front edge of the right side wall 280 via a right front hinge 232.

The rear wall 240 may be a support for the rear edge of the top surface 200. The rear wall 240 may be substantially the same width as the front wall 220. The left edge of the rear wall 240 may be hingedly coupled to the rear edge of the left side wall 260 via a left rear hinge 250. The right edge of the rear wall may be hingedly coupled to the rear edge of the right side wall 280 via a right rear hinge 252.

The rear wall 240 may be higher than the front wall 220 so that the top surface 200 is inclined. In some embodiments, the ratio of rear wall height to front wall height may be 5:3. In some embodiments, an angle of inclination 255 may be 22+/−10 degrees.

The left side wall 260 may be a support for the left edge of the top surface 200. The left side wall 260 may comprise a left front panel 264 and a left rear panel 262. The front edge of the left rear panel 262 may be hingedly coupled to the rear edge of the left front panel 264 via a left center hinge 265. The left center hinge 265 may hinge such that the left center hinge 265 moves towards the center of the invention 100. The left front panel 264 and the left rear panel 262 may move inwards at the left center hinge 265 while remaining coupled to each other as the invention 100 collapses. The left front panel 264 may remain coupled to the front wall 220 and the left rear panel 262 may remain coupled to the rear wall 240 as the invention 100

The right side wall 280 may be a support for the right edge of the top surface 200. The right side wall 280 may comprise a right front panel 284 and a right rear panel 282. The front edge of the right rear panel 282 may be hingedly coupled to the rear edge of the right front panel 284 via a right center hinge 285.

The right center hinge 285 may hinge such that the right center hinge 285 moves towards the center of the invention 100. The right front panel 284 and the right rear panel 282 may move inwards at the right center hinge 285 while remaining coupled to each other as the invention 100 collapses. The right front panel 284 may remain coupled to the front wall 220 and the right rear panel 282 may remain coupled to the rear wall 240 as the invention 100

An individual hinge 290 selected from the left front hinge 230, the right front hinge 232, the left rear hinge 250, the right rear hinge 252, the left center hinge 265, the right center hinge 285, the top front hinge 212, the top rear hinge 214, and the top center hinge 210 may comprise a first plurality of tabs 291, a second plurality of tabs 294, and a hinge pin 297. The first plurality of tabs 291 may be equaled spaced along an edge of a first panel 293. The first plurality of tabs 291 may comprise a first plurality of hinge apertures 292 and the first plurality of hinge apertures 292 may align with each other. The second plurality of tabs 294 may be equaled spaced along an edge of a second panel 296. The second plurality of tabs 294 may comprise a second plurality of hinge apertures 295 and the second plurality of hinge apertures 295 may align with each other. The first panel 293 and the second panel 296 may be positioned such that the first plurality of tabs 291 and the second plurality of tabs 294 are interspersed between each other with the first plurality of hinge apertures 292 aligned with the second plurality of hinge apertures 295. The hinge pin 297 may be passed through the first plurality of hinge apertures 292 and the second plurality of hinge apertures 295 to form the individual hinge 290.

The individual hinge 290 may be formed such that the individual hinge 290 does not open beyond the point where the first panel 293 and the second panel 296 form a flat plane. As a non-limiting example, as the individual hinge 290 opens the first plurality of tabs 291 on the first panel 293 may butt against the second panel 296 and/or the second plurality of tabs 294 on the second panel 296 may butt against the first panel 293 when the first panel 293 and the second panel 296 are planar. Thus, the top center hinge 210 may open to the point where the top front panel 204 and the top rear panel 202 form a plane which is the top surface 200. The left center hinge 265 may open to the point where the left front panel 264 and the left rear panel 262 form a plane which is the left side wall 260. The right center hinge 285 may open to the point where the right front panel 284 and the right rear panel 282 form a plane which is the right side wall 280.

The front wall 220, the rear wall 240, the left side wall 260, the right side wall 280, the top surface 200, or combinations thereof may each comprise one or more cutouts 245. The one or more cutouts 245 may be voids to reduce the overall weight of the invention 100.

The invention 100 may collapse when the left side wall 260 is hinged inwards, the right side wall 280 is hinged inwards, and the top surface 200 is hinged up simultaneously. The invention 100 may be opened when the left side wall 260 is hinged outwards until planar, the right side wall 280 is hinged outwards until planar, and the top surface 200 is hinged down until planar simultaneously.

In use, the invention 100 is opened and placed in front of the seat. The invention 100 may be opened by simultaneously hinging the left side wall 260 outwards until planar, hinging the right side wall 280 outwards until planar, and hinging the top surface 200 down until planar. The invention 100 may be positioned with the rear wall 240, which is higher, away from the seat and the front wall 220 towards the seat. When no longer needed, the invention 100 may be folded flat by simultaneously hinging the left side wall 260 inwards, hinging the right side wall 280 inwards, and hinging the top surface 200 up.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used herein, "align" refers to the placement of two or more components into positions and orientations which either arranges the components along a straight line or within the same plane or which will allow the next step of assembly to proceed. As a non-limiting example, the next step of assembly may be to insert one component into another component, requiring alignment of the components.

As used in this disclosure, an "aperture" is an opening in a surface. Aperture may be synonymous with hole, slit, crack, gap, slot, or opening.

As used herein, the words "couple", "couples", "coupled" or "coupling", refer to connecting, either directly or indirectly, and does not necessarily imply a mechanical connection.

As used herein, "front" indicates the side of an object that is closest to a forward direction of travel under normal use of the object or the side or part of an object that normally presents itself to view or that is normally used first. "Rear" or "back" refers to the side that is opposite the front.

As used in this disclosure, a "hinge" is a device that permits the turning, rotating, or pivoting of a first object relative to a second object.

As used herein, the word "substantially" indicates that two or more attributes are the same except for a margin of error related to variances in materials, manufacturing processes, craftsmanship, installation, environmental conditions, or other factors that may influence the attributes and that the differences introduced by these factors are not considered detrimental to the operation of the invention as described herein.

With respect to the above description, it is to be realized that the optimum dimensional relationship for the various components of the invention described above and in FIGS. 1 through 9, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A collapsible travel stool comprising:
a top surface, a front wall, a rear wall, a left side wall, and a right side wall;
wherein the collapsible travel stool is a stool with an inclined top;
wherein the top surface, the left side wall, and the right side wall are hinged so that the collapsible travel stool collapses for storage and transport;
wherein the top surface is an inclined plane adapted for a user to place their feet upon when the collapsible travel stool is open and in front of a seat;
wherein the rear edge of the top surface is hingedly coupled to the top edge of the rear wall via a top rear hinge;
wherein the front edge of the top surface is hingedly coupled to the top edge of the front wall via a top front hinge;
wherein the top surface comprises a top front panel and a top rear panel;
wherein a front edge of the top rear panel is hingedly coupled to a rear edge of the top front panel via a top center hinge;
wherein the top front panel is longer front-to-rear than the top rear panel such that the top center hinge is closer to the rear wall than to the front wall;
wherein a length of the top front panel is substantially the same as a height of the rear wall, and a length of the top rear panel is substantially the same as a height of the front wall.

2. The collapsible travel stool according to claim 1
wherein the top surface is at least as wide as the width of the front wall and the rear wall;
wherein the top surface is higher at the rear of the collapsible travel stool than it is at the front of the collapsible travel stool;
wherein the top surface rests upon the top edge of the left side wall and upon the top edge of the right side wall when the collapsible travel stool is opened for use.

3. The collapsible travel stool according to claim 2
wherein the top front panel and the top rear panel are equal widths.

4. The collapsible travel stool according to claim 3
wherein the top center hinge hinges such that the top center hinge moves upwards;
wherein the top front panel and the top rear panel lift up at the top center hinge while remaining coupled to each other as the collapsible travel stool collapses;
wherein the top front panel remains coupled to the front wall and the top rear panel remains coupled to the rear wall as the collapsible travel stool collapses.

5. The collapsible travel stool according to claim 4
wherein the front wall is a support for the front edge of the top surface;
wherein the left edge of the front wall is hingedly coupled to the front edge of the left side wall via a left front hinge;
wherein the right edge of the front wall is hingedly coupled to the front edge of the right side wall via a right front hinge.

6. The collapsible travel stool according to claim 5
wherein the rear wall is a support for the rear edge of the top surface;
wherein the rear wall is substantially the same width as the front wall;
wherein the left edge of the rear wall is hingedly coupled to the rear edge of the left side wall via a left rear hinge;
wherein the right edge of the rear wall is hingedly coupled to the rear edge of the right side wall via a right rear hinge.

7. The collapsible travel stool according to claim 6
wherein the rear wall is higher than the front wall so that the top surface is inclined.

8. The collapsible travel stool according to claim 7
wherein the ratio of rear wall height to front wall height is 5:3;
wherein an angle of inclination is 22+/−10 degrees.

9. The collapsible travel stool according to claim 7
wherein the left side wall is a support for a left edge of the top surface;
wherein the left side wall comprises a left front panel and a left rear panel;
wherein a front edge of the left rear panel is hingedly coupled to a rear edge of the left front panel via a left center hinge.

10. The collapsible travel stool according to claim 9
wherein the left center hinge hinges such that the left center hinge moves towards the center of the collapsible travel stool;
wherein the left front panel and the left rear panel move inwards at the left center hinge while remaining coupled to each other as the collapsible travel stool collapses;
wherein the left front panel remains coupled to the front wall and the left rear panel remains coupled to the rear wall as the collapsible travel stool collapses.

11. The collapsible travel stool according to claim 10
wherein the right side wall is a support for a right edge of the top surface;
wherein the right side wall comprises a right front panel and a right rear panel;
wherein a front edge of the right rear panel is hingedly coupled to a rear edge of the right front panel via a right center hinge.

12. The collapsible travel stool according to claim 11
wherein the right center hinge hinges such that the right center hinge moves towards the center of the collapsible travel stool;
wherein the right front panel and the right rear panel move inwards at the right center hinge while remaining coupled to each other as the collapsible travel stool collapses;
wherein the right front panel remains coupled to the front wall and the right rear panel remains coupled to the rear wall as the collapsible travel stool collapses.

13. The collapsible travel stool according to claim 12 wherein an individual hinge selected from the left front hinge, the right front hinge, the left rear hinge, the right rear hinge, the left center hinge, the right center hinge, the top front hinge, the top rear hinge, and the top center hinge comprises a first plurality of tabs, a second plurality of tabs, and a hinge pin;
wherein the first plurality of tabs are equal-spaced along an edge of a first panel;
wherein the first plurality of tabs comprise a first plurality of hinge apertures and the first plurality of hinge apertures align with each other;
wherein the second plurality of tabs are equal-spaced along an edge of a second panel;
wherein the second plurality of tabs comprise a second plurality of hinge apertures and the second plurality of hinge apertures align with each other;
wherein the first panel and the second panel are positioned such that the first plurality of tabs and the second plurality of tabs are interspersed between each other with the first plurality of hinge apertures aligned with the second plurality of hinge apertures;
wherein the hinge pin is passed through the first plurality of hinge apertures and the second plurality of hinge apertures to form the individual hinge.

14. The collapsible travel stool according to claim 13
wherein the individual hinge is formed such that the individual hinge does not open beyond the point where the first panel and the second panel form a flat plane.

15. The collapsible travel stool according to claim 14
wherein as the individual hinge opens the first plurality of tabs on the first panel butt against the second panel and/or the second plurality of tabs on the second panel butt against the first panel when the first panel and the second panel are planar.

16. The collapsible travel stool according to claim 15
wherein thus, the top center hinge opens to the point where the top front panel and the top rear panel form a plane which is the top surface;
wherein the left center hinge opens to the point where the left front panel and the left rear panel form a plane which is the left side wall;
wherein the right center hinge opens to the point where the right front panel and the right rear panel form a plane which is the right side wall.

17. The collapsible travel stool according to claim 16
wherein the front wall, the rear wall, the left side wall, the right side wall, the top surface, or combinations thereof each comprise one or more cutouts;
wherein the one or more cutouts are voids to reduce an overall weight of the collapsible travel stool.

18. The collapsible travel stool according to claim 17
wherein the collapsible travel stool collapses when the left side wall is hinged inwards, the right side wall is hinged inwards, and the top surface is hinged up simultaneously;
wherein the collapsible travel stool is opened when the left side wall is hinged outwards until planar, the right side wall is hinged outwards until planar, and the top surface is hinged down until planar simultaneously.

\* \* \* \* \*